July 27, 1937.  C. C. MAGEE  2,088,300
PARKING DEVICE
Filed Nov. 13, 1933  4 Sheets-Sheet 1
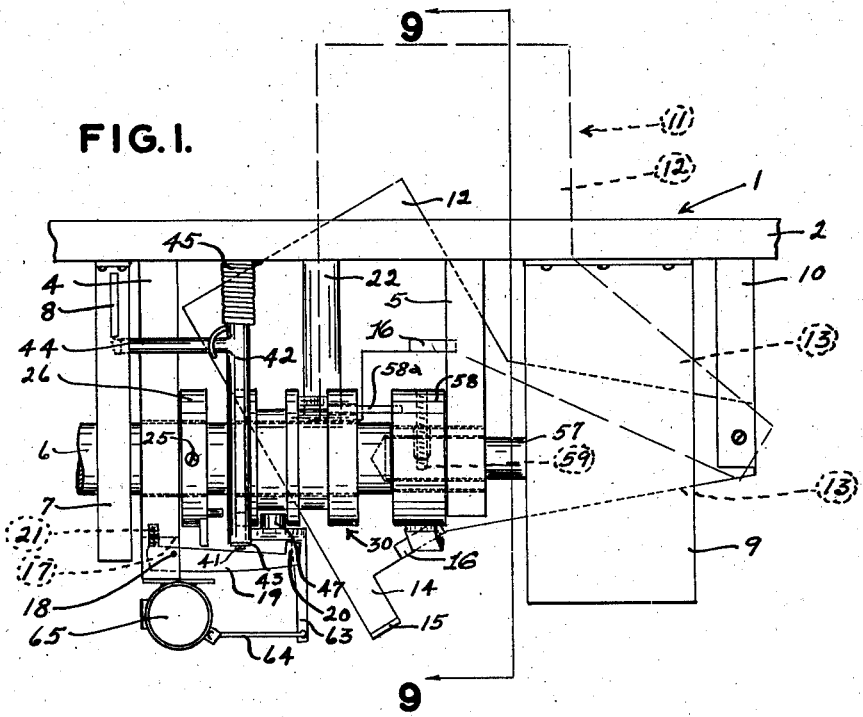
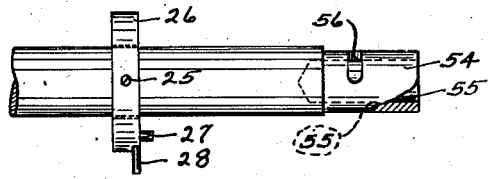 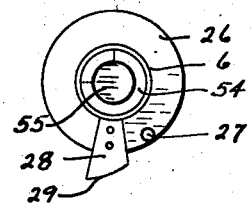
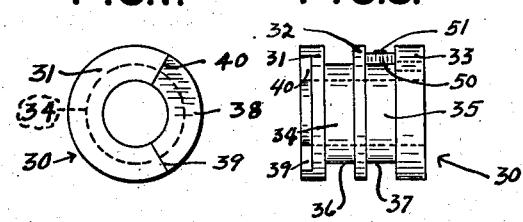 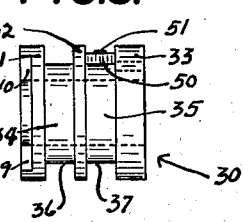 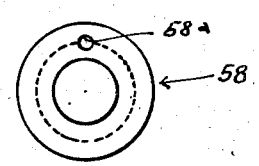
Carl C. Magee
INVENTOR.
BY Loyal J. Miller
ATTORNEYS.

Carl C. Magee
INVENTOR.
BY Loyd J. Miller
ATTORNEYS.

July 27, 1937.  C. C. MAGEE  2,088,300
PARKING DEVICE
Filed Nov. 13, 1933   4 Sheets-Sheet 3

Carl C. Magee
INVENTOR.
BY Loyal J. Miller
ATTORNEYS.

July 27, 1937.    C. C. MAGEE    2,088,300
PARKING DEVICE
Filed Nov. 13, 1933    4 Sheets-Sheet 4

Carl C. Magee  INVENTOR.
BY Loyal J. Miller
ATTORNEYS.

Patented July 27, 1937

2,088,300

UNITED STATES PATENT OFFICE 2,088,300

PARKING DEVICE

Carl C. Magee, Oklahoma City, Okla., assignor to Dual Parking Meter Company, Oklahoma City, Okla., a corporation of Delaware Application November 13, 1933, Serial No. 697,774

6 Claims. (Cl. 116—115)

My invention relates to mechanism for checking time, and more particularly to mechanism for determining or indicating when a predetermined period of time elapses after the mechanism has been placed in operation.

The prime object of the invention is to provide a device for regulating and controlling vehicle parking.

Other objects of the invention are to provide a device of this class which is new, novel, practical and of utility; which will be positive in action, simple in construction and comparatively cheap to manufacture; which may be placed in operation only by the release of a locking mechanism, preferably after the insertion of a coin, and after being placed in operation will automatically give a signal when a predetermined period of time has elapsed; and, which will be efficient in accomplishing all the purposes for which it is intended.

The device may be used, of course, for checking time for any desired purpose.

The device consists substantially of a housing, preferably adapted to be mounted on a post permanently set or anchored in the street curb at each parking place; a signal carried by the housing; a timing mechanism for actuating the signal; and, coin controlled apparatus for permitting the timing mechanism to be started into operation.

The particular type of coin operated mechanism disclosed herein is not claimed in this application as the invention, since it is obvious that various types of coin operated mechanisms could be used.

With these and other objects in view as will more fully appear, my invention consists in the construction, novel features, and combination of parts hereinafter more fully described, pointed out in the claims hereto appended, and illustrated in the accompanying four sheet drawing, of which, Figure 1 is a front elevational view of the device with most of the housing broken away;

Fig. 2 is a detail of the main shaft;

Figs. 3, 4, 5, and 6 are details of various elements carried by the shaft;

Like characters of reference designate like parts in all the figures.

It is understood that various changes in the form, proportion, size, shape, weight and other details of construction, within the scope of my invention may be resorted to without sacrificing any of the advantages, and without departing from the spirit or broad principle of my invention; and it is also understood that the drawings are to be interpreted as being illustrative and not restrictive.

Figure 14:
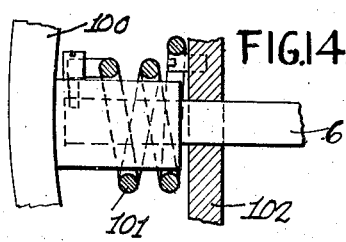

A description of one practical embodiment of the invention follows:

The reference numeral 1 indicates as a whole the top plate of a housing, and the reference numerals 2 and 3, respectively, indicate the front and rear edges of the plate 1. Depending spaced bearing supports or hangers 4 and 5 are rigidly connected to or made integral with the nether surface of the plate 1, and a main shaft 6 is journaled in the hangers. Looking from the front, the left hand end of the shaft 6 extends outwardly through the left hand end 102 of the housing, and its extreme left hand end is provided with a knob or hand wheel 100, Fig. 14, whereby the shaft may be manually rotated, and a spring 101 is provided in connection therewith for returning the hand wheel and the shaft 6 to its normal radial position.

Throughout the description herein wherever "right hand" or "left hand" occurs, it is intended to mean while looking from in front of the housing.

A coin operated mechanism 7 having a slot 8 for receiving a coin is attached to the plate 1 adjacent the left hand end of the housing, and adjacent the right hand end is a housing 9 containing a usual gear train of any desired type for driving the shaft 6 to rotate over and towards the rear at a uniform speed.

At the right hand end of the housing and adjacent the rear wall thereof is a depending bracket or signal support 10, to the lower portion of which is pivotally connected, to swing in a plane parallel to the rear wall of the housing, a metal plate or signal 11. The signal 11 has a substantially rectangular portion 12 having an integral elongated portion 13 extending to the right and downwardly from its lower right hand corner, and it is the portion 13 which is pivotally connected to the bracket 10. At the lowermost left hand corner of the portion 12 is provided an integral depending leg 14 having a foot 15 (Figs. 1, 8, and 9) turned perpendicularly forwardly therefrom. At a point adjacent and slightly to the left of the junction of the lower edge of the rectangular portion 12 and the elongated portion 13, the lower edge of the signal is provided with a second foot 16 which is also turned perpendicularly forward from the signal. The offices of the feet 15 and 16 will be more fully described hereinbelow.

Figure 7:
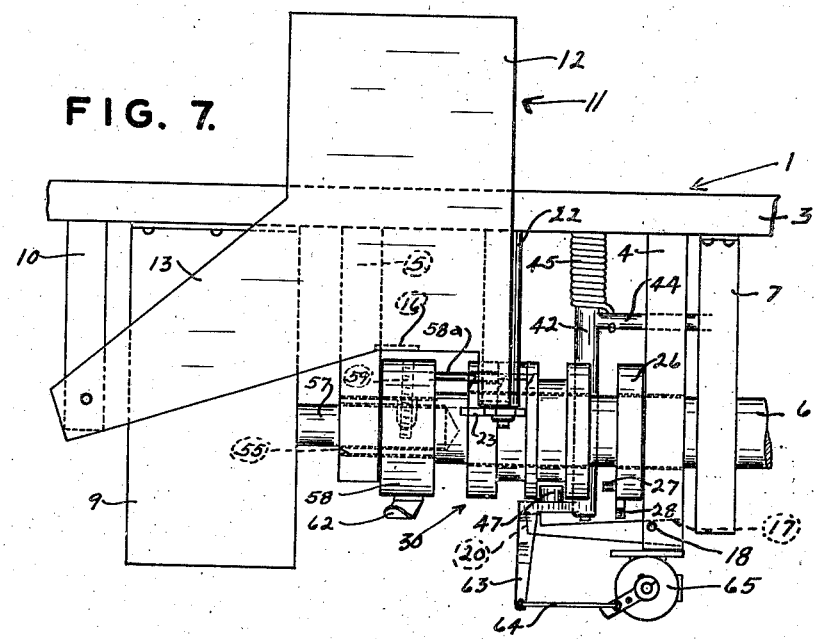
Fig. 7 is a rear view of the mechanism shown in Fig. 1.

The lower end of the hanger 4 is bifurcated by a superficial groove 17 (Figs. 1 and 7) which is in vertical alinement with the axis of the shaft 6, and pivotally mounted at one end upon a pin 18 extending through the hanger 4 transversely of the groove 17 is a latch arm 19, the free end of which extends toward the right beneath said shaft 6. The free end of latch arm is provided with an upstanding portion 20. The free end of the latch arm 19 is urged to normally remain at the upper end of its throw by downward pressure exerted upon the left hand end of the latch arm by a coil spring 21 (Fig. 1). The office of the latch arm 19 will be more fully described hereinbelow.

Figure 8:
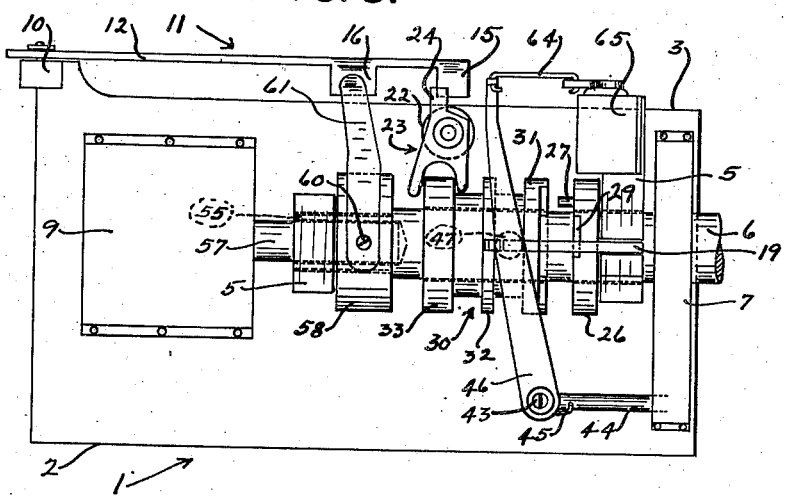
Fig. 8 is a bottom view of the mechanism shown in Figs. 1 and 7.
Figure 9:
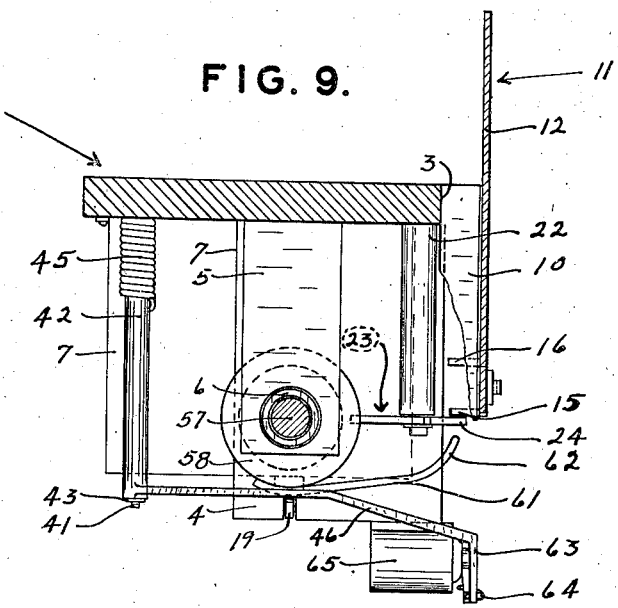
Fig. 9 is a sectional view taken along the line 9—9 of Fig. 1.

As may best be seen in Figs. 8 and 9, a depending arm 22 is rigidly attached to or made integral with the nether surface of the plate 1 at a point slightly to the rear of the shaft 6 and approximately in alinement with the right hand edge of the signal 11 when the signal is at the upper end of its throw. The lower end of the arm 22 pivotally supports a latch member 23 which is adapted to move pivotally in a plane perpendicular to the axis of the arm 22. The rearmost end 24 of the latch member 23 is of a length sufficient to pass into a position beneath the foot 15 of the signal 11 when the signal is swung to the uppermost end of its throw, and the length of the arm 22 is sufficient to permit such passage when the latch member is partly rotated. The forward-most end of the latch member 23 is bifurcated, (Fig. 8), and extends towards the shaft 6 at a height slightly above the axis of the shaft (see Fig. 7). The office of the latch member 23 is to contact the lower surface of the foot 15 and hold the signal 11 at the upper end of its throw when the member is rotated properly to bring its end 24 into engagement with said foot. The means for raising the signal 11 and partially rotating the latch member 23 will be more fully described hereinbelow.

Anchored to the shaft 6 adjacent the right hand face of the hanger 4 by a set screw 25 is a combined set-collar and male clutch member 26. (Detail Figs. 2 and 3.) The right hand face of the collar 26 is provided with a perpendicularly outstanding clutch pin 27, and a cam 28, having an arcuate free end portion 29 (Fig. 3), is formed integral with or is attached firmly to the collar in such a manner that it projects outwardly from the periphery thereof. The cam 28 is of a length sufficient to cause its arcuate end 29 to contact the upper surface of the free end of the latch-arm 19 and force it out of its normal position in a direction away from the shaft 6 when the shaft 6 is partially rotated.

In Figs. 4, 5, 10, and 11 is illustrated, respectively, a left hand end view, a front elevation, a rear elevation, and a right hand end view of a combined female clutch and multiple cam member 30 which is mounted slidably and rotatably upon the shaft 6 next adjacent to the collar 26.

The member 30 consists substantially of three spaced disks 31, 32 and 33 which are connected integrally by two cylindrical portions 34 and 35 which are of a diameter somewhat less than the diameter of the disks. Thus, annular notches or runs 36 and 37 are respectively formed between the disks 31 and 32 and between the disks 32 and 33.

The left hand end face of the member 30, or in other words the outer face of the disk 31, has an arcuate indented portion 38 having abrupt shoulders 39 and 40 at its ends. This indented portion forms the female clutch member and the shoulder 39 is adapted to be engaged by the pin 27 when the member 30 is moved longitudinally to bring the disk 31 into contact with the collar 26 and when the shaft 6 is then rotated in a direction to cause the pin 27 to travel downwardly and toward the rear.

As a means for causing the longitudinal movement of the member 30 toward the collar 26 when the coin mechanism 7 is operated, the following described structure is provided.

A depending rod 41 (Figs. 1 and 9) is made integral with or is attached firmly to the bottom surface of the plate 1 at a point adjacent the mechanism 7 and slightly in front of the shaft 6. A sleeve 42 is rotatably mounted upon the rod 41 and is held in place by any desired means 43 upon the lower end of the rod. The sleeve is provided with an arm 44 the free end of which extends perpendicularly from the sleeve into the mechanism 7, and which is adapted to be forced toward the front of the housing when the mechanism 7 is operated. As previously stated above, any desired means may be used for moving the arm 44 forwardly. A coil spring 45 is provided around the upper end of the sleeve 42 for urging the sleeve to an axial position in which it will normally hold the arm 44 at the rearmost end of its throw. The lower end of the sleeve 42 is provided with a second arm 46 which extends perpendicularly outwardly therefrom at substantially a ninety degree angle from the direction in which the arm 44 extends. The sleeve 42 and the arms 44 and 46 form substantially a bellcrank. The arm 46 passes toward the rear of the housing directly beneath the member 30 and across the groove 36 therein, and is provided upon its upper surface with a cylindrical upstanding projection 47 the free end of which is engaged in the groove 36 and between the disks 31 and 32. The arm also extends adjacent to and slightly above the latch 19 carried by the lower end of the hanger 4. The arm 46 and the latch 19 bear such relation that when the arm 44 is forced forwardly by the coin mechanism 7, and the sleeve 42 is thus slightly rotated causing the arm 46 to be moved toward the left hand end of its throw, the member 30 is moved by the projection 47 longitudinally upon the shaft 6 toward the collar 26. This movement brings the right hand edge of the arm 46 slightly to the left of the upstanding portion 20 of the latch 19, and permits the spring 21 to force the portion 20 upwardly thus temporarily latching the arm 46 in that position.

It might well be stated at this point that the mechanism 7 is such that it is operated to move the arm 44 by the manual rotation of the previously described hand wheel on the left hand end of the shaft 6, and this movement is so timed, that the arm 44 is moved and the member 30 is slid on the shaft 6 to the left hand end of its throw before the clutch-pin 27 has travelled far enough to engage the shoulder 39 on the disk 31. Also, that the radial relation of the pin 27 and the cam 28 is such that the member 30 will be rotated approximately forty-five degrees before the cam engages the latch-arm 19 and forces it out of engagement with the arm 46 thus permitting the spring 45, arm 46 and projection 47 to return the member 30 to the right hand end of its throw which is its normal inactive position.

A spring 101 and a stop, not shown, are provided at the left hand end portion of the shaft 6 for forcing the exterior hand wheel and the shaft 6 to assume a normal position with the cam 28 extending toward the front of the housing when the hand wheel is released after it has been partially rotated as previously described hereinabove.

Referring now more particularly to Fig. 8, a description will be made of the structure whereby the previously described latch 23 is actuated.

As best seen in Fig. 8, the bifurcated front end of the latch straddles the disk 33 of the member 30, and consequently when the cam 28 forces the latch 19 out of engagement with the arm 46, and when the member 30 is thus permitted to return to its normal position at the right hand end of its throw, the end 24 of the latch 23 is forced to assume a position in the path of travel of the foot 15 of the signal 11. Therefore if the signal had been previously moved to the upper end of its throw, the end 24 would prevent its swinging downwardly so long as the latch 23 remained in that position.

Figure 10:
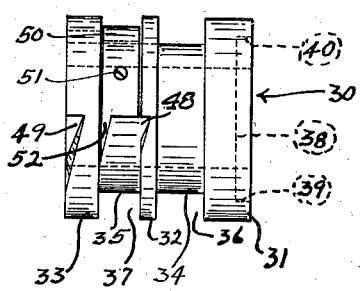
Figs. 10 and 11 are details of a cam element carried by the main shaft.
Figure 11:
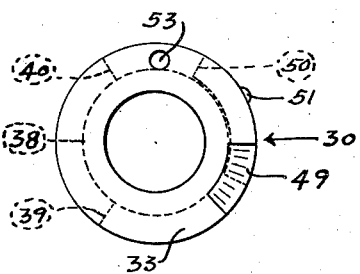

In Figs. 10 and 11 may best be seen the structure whereby the latch 23 may be moved to disengage the end 24 from the foot 15. Upon the rear peripheries of each of the disks 32 and 33 are provided angular parallel grooves 48 and 49 which are of a depth equal to the depth of the previously described annular groove 37. The groove 48 in the disk 32 communicates with the left hand side of the groove 37 while the groove 49 is indented into the right hand face of the disk 33. A metal insert 50 is held in the groove 37 by a set screw 51 and the right side of the lower end thereof is provided with a bevelled portion 52. Since the bifurcated end of the latch 23 straddles the disk 33, it may be seen that rotation of the member 30 in a direction to bring the point of the bevelled portion 52 first into contact with the latch 23, will force the bifurcated end of the latch toward the left which will in turn withdraw the end 24 from beneath the foot 15 of the signal.

The right hand end of the disk 33 is provided with a cylindrical cavity 53 the office of which will be more fully described hereinbelow.

As may best be seen in Fig. 2, the right hand end portion of the shaft 6 is reduced in diameter and the reduced portion 54 is provided with an axial bore 55 and communicating with the bore 55 is a transverse groove 56 which encompasses approximately one hundred eighty degrees of the circumference of the reduced portion. A drive shaft 57 (Figs. 1, 7 and 8), has its left hand end portion inserted into the bore 55, and a collar 58 is rotatively positioned upon the reduced portion 54 by a set screw 59 which is threaded transversely therethrough into the shaft 57 and which passes through the groove 56, the groove being greater in width than the diameter of the set screw.

The connection between the collar 58 and the shaft 57 is thus rigid at all times, and when the shaft 6 is rotated in a forward direction the rear end of the groove 56 will contact the set screw 59 and force the shaft 57 to a similar rotation. After the drive shaft 57 has thus been partially rotated to wind the driving mechanism of the gear train, release of the hand wheel, through the office of the groove 56, will permit the shaft 6 to reassume its original position without imparting movement to the shaft 57. The shaft 57 may then be rotated in a rearward direction for approximately one hundred eighty degrees independently of the shaft 6.

In Fig. 6 is illustrated the left hand face of the collar 58 which is provided with a rod 58a which extends into the cylindrical cavity 53 carried by the right hand end of the disk 33 and which is slightly smaller in diameter than the diameter of the cavity. The rod 58a is of such a length and the cavity 53 is of such a comparative depth that engagement is maintained between the member 30 and the collar 58 regardless of the possible position of the member 30 longitudinally upon the shaft 6.

To the lower portion of the periphery of the collar 58 (Fig. 8) is rigidly attached by a stud bolt 60 a rearwardly extending arm 61 having its free end 62 (Fig. 7) slightly upturned. The arm 61 is of the correct length to bring its free end into contact with the nether surface of the foot 16 on the signal 11 when the collar 58 is sufficiently rotated in a forward direction. The arm 61 is the means whereby the signal is raised and is so positioned radially upon the collar 58 that the signal is raised to the uppermost end of its throw before the end 24 of the latch 23 is urged by the disk 33 to the rearmost end of its throw.

As may best be seen in Figs. 1, 7, 8, and 9, the rearmost end 63 of the previously described arm 46 is operatively connected by a link 64 to a suitable counting device 65 so that the number of operations of the device may be ascertained.

*Operation*

Normally the arm 44 is at the rearmost end of its throw, the member 30 is at the right hand end of its throw, the latch 19 is out of engagement with the arm 46, the signal is down, the end 24 of the latch 23 is out of the path of travel of the foot 15 carried by the signal, and the gear train or power apparatus is idle.

A coin is inserted in the slot 8 and the exterior hand wheel 100 on the left hand end of the shaft 6 is turned forwardly toward the arm 44. The coin mechanism forces the arm 44 forwardly, thus, through the action of the arm 46 and projection 47, engaging the clutch members and causing the rotation in a similar direction of the member 30, which in turn, through the action of the rod 58a, also causes the similar rotation of the collar 58. At the same time the shaft 57 is also rotated forwardly by the collar 58 and the clock mechanism is thus wound.

The movement of the arm 46 to the left permits the latch 19 to engage the arm and hold the clutch members in temporary engagement, to be released later as the movement continues, by the arcuate end of the cam 28. Rotation of the collar 58 causes the arm 61 to contact the foot 16 and raise the signal 11 to the uppermost end of its throw. When the latch 19 is released by the cam 28, the member 30 is suddenly forced toward the right by action of the spring 45 and arm 46, which movement causes the end 24 of the latch 23 to assume a position beneath the foot 15 of the signal and thus hold it in place at the upper end of its throw.

The hand wheel is then released and the shaft 6 returns, through the action of the spring 101 in connection with the hand wheel 100, to its original position. However, since the gear train is adapted to drive the shaft 57 toward the rear at a uniform speed, the collar 58 and the member 30 can travel in that direction only as permitted by the gear train, however, the slot 56 is of sufficient length to permit the shaft 6 to return to its original axial position without its end contacting the set-screw 59. It may be seen that the groove 56 permits a partial rotation of the shaft 6 in either direction without imparting a similar movement of the shaft 57 except when the clutch members are in engagement. The speed of the shaft 57 may be governed so that it reaches its original radial position only after a desired period of time has elapsed. When the member 30 finally reaches its approximate original position, the bevelled end 52 of the insert 50 in the groove 37 will cause the bifurcated end of the latch 23 to move toward the left hand which will cause the end 24 of the latch to be withdrawn from beneath the foot 15. When this occurs, the signal will fall to its original position. The various parts of the mechanism will then be in their original positions.

It will be obvious that each successive reciprocation of the free end 63 of the arm 46 will operate the counting device 65 once, and once only.

Another coin may be inserted and the operation repeated regardless of whether or not the shaft 57 has been rotated sufficiently to drop the signal.

Figure 12:
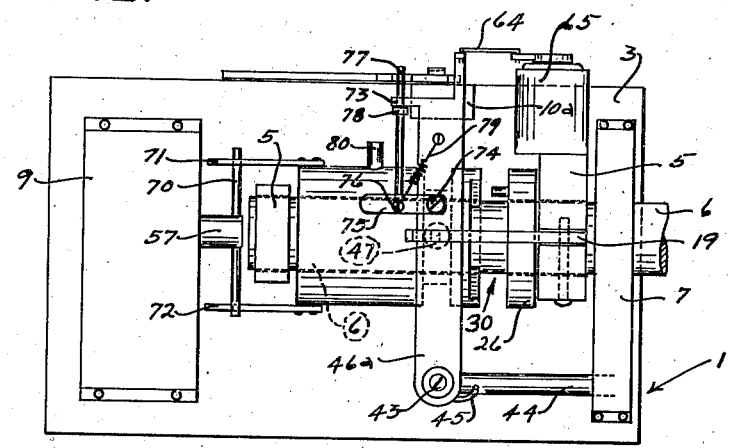
Figs. 12 and 13 are respectively bottom plan and rear elevational views of a slightly different embodiment of the invention; and, Fig. 14 is a fragmentary elevational view, partially in section, detailing a portion of the device.
Figure 13:
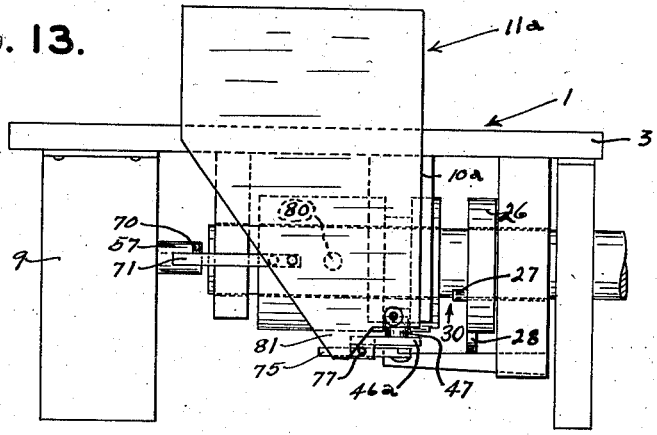

In Figs. 12 and 13 is illustrated a slightly different embodiment of the invention, in which slightly different mechanism has been used for connecting the shaft 6 with the drive shaft 57, and in which a different means is shown for raising and lowering the signal.

A rod 70 extends outwardly in both directions from the left hand end of the shaft 57, which shaft terminates short of the right hand end of the shaft 6. The shaft 57 is attached to the periphery of the right hand end of the member 30 by means of the two arms 71 and 72 which extend past the rod 70. The rod 70 passes between the arms 71 and 72 and is of a length greater than the distance between them. Therefore a turn of approximately one hundred eighty degrees may be made by the shaft 6 without imparting a like movement to the shaft 57.

In the last above mentioned embodiment for raising and lowering the signal, the arm 46 has been replaced by an arm 46a which in configuration is somewhat different from the arm 46. However, the front end of the arm 46a is mounted on the sleeve 42 the same as was arm 46, as more clearly shown in Figs. 1 and 7, and its free or rear end is connected to the counting mechanism 65 in an identical manner. Also the arm 46a is also provided with the projection 47. Adjacent its rear end the arm 46a is provided with an extension 73 which projects toward the right hand and this extension is provided with a transverse perforation. To the nether surface of the arm 46a, at substantially its mid-point, is pivotally connected by a screw 74, a flat arm 75, the right hand end of which is free to move arcuately in a plane parallel to the plane of travel of the arm 46a and perpendicular to the plane of travel of the signal. To the flat arm 75 is pivotally connected by a screw 76, a plunger rod 77 the rear end portion of which passes through the previously described perforation in the projection 73 carried by the arm 46a. The perforation is somewhat larger than the plunger rod 77 and acts as a guide therefor as will be more fully described hereinbelow. An enlargement 78 is carried by the plunger rod to limit the extent to which it may be moved longitudinally in the perforation. A retrieving spring 79 extends between the arms 46a and 75 and urges the arm 75 to normally remain at the rear end of its throw.

The disks 32 and 33, and the run 37 are eliminated from this embodiment of the invention, and the right hand portion of the member 30 is made cylindrical. This cylindrical portion is made with a peripheral projection or protuberance 80 which is adapted to contact the free end of the flat arm 75 and force it, against the action of the spring 79, toward the front of the device when the member 30 is rotated. This movement of the arm 75 causes a longitudinal movement of the rod 77 away from the signal.

As may best be seen in Fig. 13, the signal 11 has in this embodiment been replaced by a signal 11a which in configuration is somewhat different from the original signal 11, and which is pivotally mounted at a different point but is adapted to travel in a plane similar to that of the original signal 11. The support 10 has been replaced by a similar support 10a carried by the plate 1 at a point adjacent its rear edge and substantially in alinement with the arm 46a when the arm is in its normal position.

The signal 11a consists substantially of a flat plate having a sloping sided extension 81 extending from its lower edge intermediate its sides. The relative position of the extension 81 and the rod 77 is such, and the pivotal point of the signal 11a is so located, that when the signal is down and the arm 46a is moved to the left end of its throw, the rear end of rod lies to the left of the left hand edge of the extension; hence, when in this position, the rod 77 may be urged by the spring 79 to travel longitudinally so that its rear end will extend slightly to the rear past the signal. However, when the signal is down and the arm 46a is at the right hand end of its throw, the rear end of the rod 77 will be prevented from contact with the front face of the signal by the protuberence 80 and will thus be prevented from travelling to the rear end of its throw. When the signal is down and arm 46a is moved to the left end of its throw, and when the rod 77 is consequently permitted to move past the signal to the rear end of its throw, subsequent movement of the arm 46a to the right hand will cause the rod 77 to move sidewise in a like direction and its contact with the extension 81 will pivotally raise the signal 11a to the uppermost end of its throw. The signal will be held in this position by the rod 77 until the member 30 is rotated by the power mechanism in housing 9 sufficiently to bring the protuberence 80 into contact with the arm 75 and thus force the arm to the front end of its throw. Forward movement of the arm 75 will withdraw the rod 77 from contact with the projection 81 and such withdrawal will permit the signal to fall to its lowermost position.

It is thought that the operation of the last mentioned embodiment has been sufficiently described hereinabove, and that further description of the operation would be superfluous.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

It is thought that the structure herein disclosed is such that it would easily lend itself to the operation of one signal when the shaft 57 or the member 30 is rotated in one direction, and to the operation of a different signal when the movement is reversed. Also that electrical signals could be used instead of a semaphore signal.

Having thus described by invention, what is claimed and desired to be secured by Letters Patent, is:

1. A device of the class described comprising a first shaft and a second shaft, arranged end to end, axially aligned, and independently journaled; a clutch connecting the shafts; a spring driven power unit for driving said first shaft in one direction; a semaphore signal; manually operable coin controlled means for simultaneously winding said power unit and for moving said signal to a signalling position; means for maintaining said signal immovable in its signalling position; and means operatively connected to said first shaft for releasing said signal maintaining means after a predetermined period of time; said signal, after it is released, adapted to return to a non-signalling position.

2. In a device of the class described, a drive shaft, a second shaft, operative connections for partially rotating the drive shaft in one direction by similar rotation of the second shaft, means for returning the second shaft to its original position when it is released, said connections permitting said return without movement to the drive shaft, and permitting the drive shaft to be partially rotated in a direction opposite to the first mentioned direction after the second shaft has been released without imparting movement to the second shaft, means for driving the drive shaft in the last mentioned direction, a semaphore signal permitted to swing in a vertical plane, means for raising the signal by rotation of the drive shaft in the first mentioned direction, means for retaining the signal in its raised position, and means for releasing said retaining means by rotation of the drive shaft in the opposite direction to a predetermined axial position.

3. In a device of the class described, a drive shaft, means for driving the shaft in one direction, a second shaft in axial alinement with the first shaft, a clutch connecting the two shafts and adapted to rotate the drive shaft in a direction opposite to its driven direction by similar rotation of the second shaft, a signal pivoted to swing in a vertical plane, means for raising the signal to its uppermost position, means operable by one of the clutch members for latching the signal in its raised position, and means for releasing the signal by rotation of the drive shaft in its driven direction to a predetermined position.

4. In a device of the class described, a drive shaft, time controlled means for driving the shaft in one direction, a second shaft, operative connections for partially rotating the drive shaft in a direction opposite to its driven direction by similar rotation of the second shaft, means for returning the second shaft to its original position when it is released, said connections permitting the drive shaft to be partially rotated in the first direction after the second shaft has been released without imparting movement to the second shaft, a semaphore signal, means for raising the signal, means for maintaining the signal in its raised position, and means carried by the drive shaft for releasing said signal maintaining means, thus allowing the signal to drop to its inoperative position.

5. A driveshaft; time controlled means for driving the shaft in one direction; a second shaft; coin controlled operative connections between the two shafts whereby the drive shaft is free to rotate in its driven direction independent of said second shaft, but is positively rotated in the opposite direction as said second shaft is rotated in that direction; a semaphore signal; operative connections between the drive shaft and the signal whereby the signal is moved to a signalling position as the drive shaft rotates in the direction opposite its driven direction; means for maintaining the signal in its signaling position; and means for releasing said signal maintaining means after the elapse of a predetermined period of time.

6. A drive shaft; time controlled means for driving the shaft in one direction; a second shaft coin controlled operative connections between the two shafts whereby the drive shaft is free to rotate in its driven direction independent of said second shaft, but is positively rotated in the opposite direction as said second shaft is rotated in that direction; a semaphore signal; operative connections between the drive shaft and the signal whereby the signal is moved to a signaling position as the drive shaft rotates in the direction opposite its driven direction; and is permitted to gravitate to a non-signaling position after the elapse of a predetermined period of time.

CARL C. MAGEE.